United States Patent [19]

Hosokawa

[11] Patent Number: 4,627,305
[45] Date of Patent: Dec. 9, 1986

[54] BICYCLE SPEED CHANGE LEVER
[75] Inventor: Mikio Hosokawa, Osaka, Japan
[73] Assignee: Maeda Industries, Ltd., Osaka, Japan
[21] Appl. No.: 746,517
[22] Filed: Jun. 19, 1985
[30] Foreign Application Priority Data
Jun. 19, 1984 [JP] Japan .............................. 59-91269[U]
[51] Int. Cl.$^4$ ............................................ G05G 11/00
[52] U.S. Cl. .................................. 74/489; 74/473 R; 74/501 R; 403/246; 411/120
[58] Field of Search ..................... 74/473 R, 475, 489, 74/491, 501 R, 523; 403/188, 199, 246; 411/338, 339, 119, 120

[56] References Cited
U.S. PATENT DOCUMENTS

| | | | |
|---|---|---|---|
| 2,924,115 | 2/1960 | Hood | 74/489 |
| 3,693,469 | 9/1972 | Ozaki | 74/489 |
| 4,156,371 | 5/1979 | Juy | 74/489 |
| 4,267,742 | 5/1981 | Cabeza | 74/473 R X |
| 4,532,825 | 8/1985 | Nagano | 74/489 X |

OTHER PUBLICATIONS
"Suntour Small Parts Catalog", Feb. 1983, p. 30-08.

Primary Examiner—Albert J. Makay
Assistant Examiner—Steven E. Warner
Attorney, Agent, or Firm—Birch, Stewart Kolasch & Birch

[57] ABSTRACT

A bicycle speed change lever comprising: a stationary support spindle having an internally threaded axial hole and fixed at its one end to a bicycle frame tube, a lever handle rotatably mounted at its hole end portion on the support spindle, a plurality of washers supported on the spindle, a clipping holder which has a pair of axially spaced, holed disk-like portions resiliently connected to a cross arm and which is non-rotatably mounted on the spindle, with the washers and the holed end portion of the lever handle sandwiched between the pair of disk-like portions, to hold them together by pressure, and a lock bolt having its threaded shank engaged with the threaded axial hole of the spindle for applying adjusted frictional force to the holed end portion of the lever handle.

5 Claims, 5 Drawing Figures

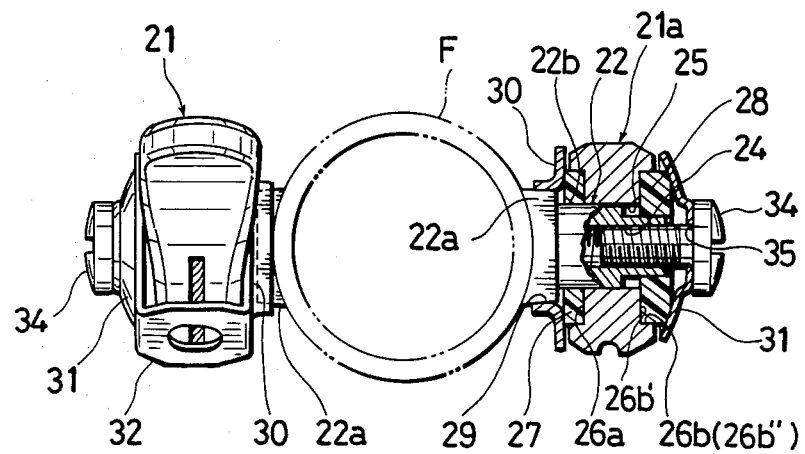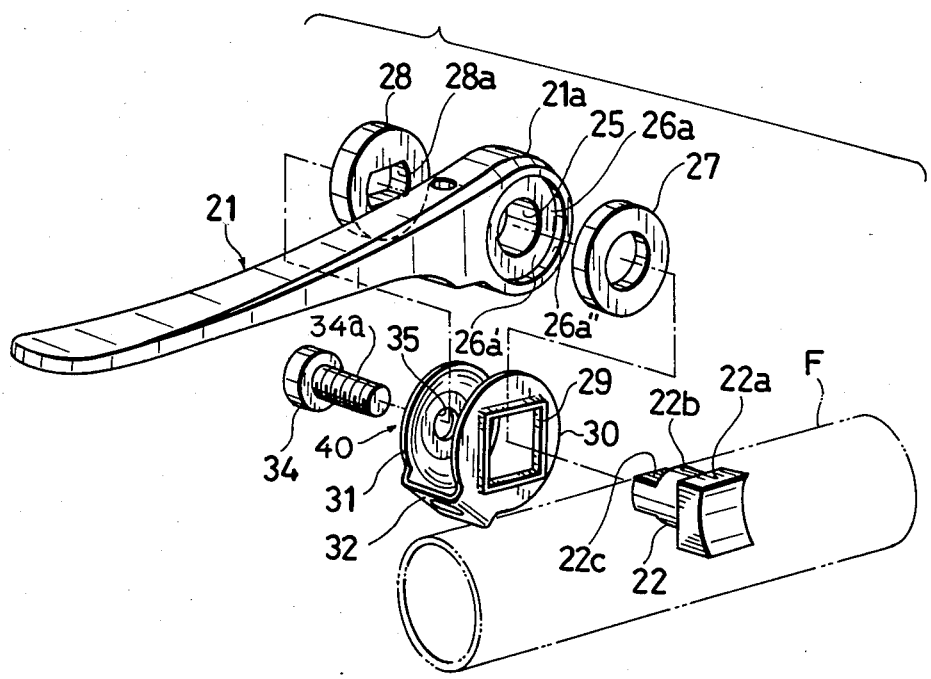

BICYCLE SPEED CHANGE LEVER

BACKGROUND AND SUMMARY OF THE INVENTION

This invention relates to a speed change lever for bicycles, and more particularly to improvements in a mounting structure for fixing the lever to a bicycle frame tube.

As is well known, the speed change lever is utilized to control a running speed of a bicycle which is equipped with a multiple freewheel (rear gear) having a plurality of different sized sprockets cooperating with a rear derailleur, wherein the bicycle speed change is generally performed by pulling or releasing a tensioned flexible control cable, which is operatively connected at its one end to a lever handle and at its other end to the rear derailleur, so that an endless drive chain can be selectively shifted from one sprocket to another sprocket of the multiple freewheel to change gear ratio.

In a particular type of bicycle which is equipped, in addition to the multiple freewheel, with a multiple chainwheel (front gear) having a plurality of different sized sprockets cooperating with a front derailleur, an additional speed change lever is required to control a bicycle running speed by pulling or releasing an additional tensioned flexible control cable, which is operatively connected at its one end to an additional lever handle and at its other end to the front derailleur, so that the endless drive chain can be selectively shifted from one sprocket to another sprocket of the multiple chainwheel to change gear ratio. Thus, this particular type of bicycle is equipped with a pair of speed change levers and a pair of control cables, namely, the first lever cooperating with the first cable to control the rear derailleur, and the second lever cooperating with the second cable to control the front derailleur. The pair of levers are usually mounted on a bicycle frame tube in a symmetrical fashion (See FIG. 2).

It is known to mount the speed change lever on a bicycle frame tube by means of a detachable clamp band or a lever mount weldable to the frame tube.

A typical example of the conventional lever, that is, the lever having the clamp band, is disclosed as Model LD-2900 in "SUNTOUR SMALL PARTS CATALOG" of February, 1983 published by the Applicant of the present invention.

For better understanding, the aforesaid model is herein illustrated in FIG. 5 of the accompanying drawings, in which a clamp band 2 is fixed to a bicycle frame tube F (e.g. a down tube) by means of a clamp screw 18 and a nut 19.

A lever support spindle 3 is fixedly connected at its one end 1 to the clamp band 2 by caulking, together with a base plate 7. The stationary support spindle 3 has an annular flange 3a disposed on the base plate 7. The free end portion of the spindle shank 3b is partially cut off at opposite sides thereof to provide a pair of flat engaging surfaces 3c. The spindle 3 has an axial threaded hole 8 which is engageable with a threaded shank of a lock bolt 14.

A lever handle 4 to be rotatably mounted at its holed end portion 5 onto the support spindle 3 has an outside seating recess 9 defined by an internal cylindrical wall and an outward facing annular wall as illustrated, an inside seating recess which is not shown but substantially identical in form to the aforesaid outside seating recess, and a through hole 6 interposed between the inside and the outside seating recesses in communication therewith.

The lever handle 4 is mounted on the support spindle 3 in such a manner that the annular flange 3a is seated in the inside seating recess while the spindle shank 3b extends through the through hole 6 so that the shank end formed with the flat engaging surfaces 3c projects out of the hole 6 into engagement with a correspondingly shaped center hole 10 of an outside washer 11, resulting in that the washer 11 is non rotatably seated in the outside seating recess 9 and sandwiched between the outward facing annular wall and a cover disk 12. An inside washer 20 is sandwiched between the annular flange 3a and an inward facing annular wall (not shown) of the inside seating recess.

The base plate 7 has an arm 16 extending in parallel with the spindle 3. The free end of the arm 16 is formed with a notch 17 which is engageable with a mating projection 15 of the cover disk 12 for preventing the latter from rotation. Thus, as will be easily understood, all of the base plate 7, the spindle 3, the outside washer 11 and the cover disk 12 are prevented from rotation.

The threaded shank of the lock bolt 14 extends through each hole of the holed members, that is, the cover disk 12, the outside washer 10, the lever handle 4, and the inside washer 20 into the threaded hole 8 of the spindle 3, when they are assembled together.

Thus, by adjustably tightening the lock bolt 14, the lever handle 4 can be held in any selected position on the spindle 3 by adjusted frictional force applied to the opposite sides of the portion 5 thereof but is rotatable on the spindle 3 against the applied firctional force as well as a tension force applied by the control cable when the lever handle 4 is manipulated by a cyclist.

Another typical example of the convertional lever, that is, the lever having a lever mount weldable to a bicycle frame tube, is also disclosed as Model LD-2950 in the above-mentioned catalog of the Applicant, in which a lever support spindle is integral with and extends from the lever mount for supporting a lever handle and various other small parts such as washers thereon.

As will be easily understood from the foregoing description with reference to FIG. 5, the bicycle speed change lever includes various small independent parts which are to be assembled in prescribed order. Therefore, the conventional bicycle lever has the following disadvantages:

The first disadvantage is that it takes a considerable time to assemble various small independent parts for the lever one by one in prescribed order, which causes inefficiency in the process for mounting the lever to a bicycle frame tube in the manufacture of bicycles;

The second disadvantage is that stock control of an asortment of various small independent parts for the lever is troublesome; and The third disadvantage is that, when the lock bolt is unexpectedly removed in use, many of the small independent parts are likely to scatter, with the result that one or more of the small parts may occasionally be lost, which is very inconvenient to an end user because the lost parts are not readily available to him.

It is, therefore, an object of the invention to provide an improved bicycle speed change lever which can be easily and quickly mounted onto a bicycle frame tube.

Another object of the invention is to provide an improved bicycle speed change lever which permits easy stock control and assortment of parts therefor.

A further object of the invention is to provide an improved bicycle speed change lever which can be assembled together so that small independent parts therefor will not easily scatter when a lock bolt is unexpectedly removed in use.

Other objects, features and advantages of the invention will become apparent from the detailed description given hereinafter; it should be understood, however, that the detailed description and specific examples, while indicating preferred embodiments of the invention, are given by way of illustration only, since various changes and modifications within the spirit and scope of the invention will become obvious to those skilled in the art from this detailed description.

According to the present invention, there is provided a bicycle speed change lever comprising: a stationary support spindle which has an axial threaded hole formed therein and an integral base portion formed therewith so as to be weldable to a bicycle frame tube, a lever handle rotatably mounted at its holed end portion on the support spindle, a plurality of washers supported on the lever spindle, a clipping holder which has a pair of axially spaced disk-like portions resiliently connected to an integral cross arm and which is non-rotatably mounted on the spindle, with the washers and the holed end portion of the lever handle sandwiched between the pair of disk-like portions, to hold them together by pressure, and a lock bolt having its threaded shank extending through each hole of the holed members supported on the spindle into engagement with the threaded hole of the spindle.

BRIEF DESCRIPTION OF THE DRAWINGS

In the accompanying drawings:

FIG. 3 is an enlarged view of FIG. 2, in which one of the pair of levers is shown in cross section taken along the lines III—III of FIG. 2 while the other of the pair of levers is shown in front elevation;

FIG. 4 is an exploded perspective view showing one of the pair of levers; and

DESCRIPTION OF THE PREFERRED EMBODIMENTS

Figure 1:
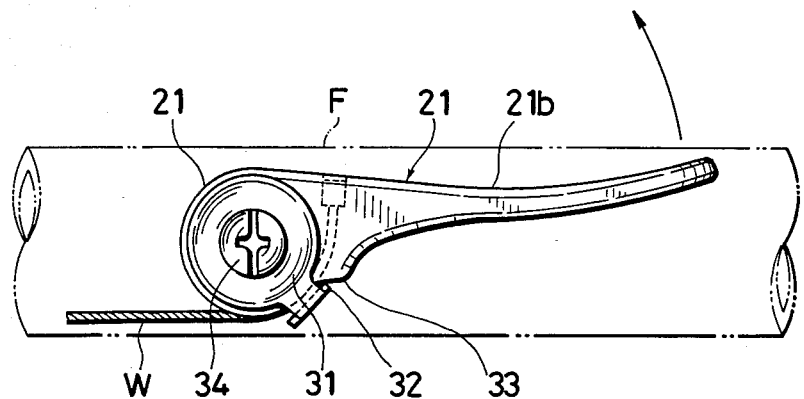
FIG. 1 is a side elevation of a pair of bicycle speed change levers of the invention mounted on a bicycle frame tube.

Referring now to the accompanying drawings, a bicycle speed change lever according to the invention is illustrated as having a clipping holder 40 featuring the invention.

The clipping holder 40 has a pair of axially spaced, holed disk-like portions 31 and 30 connected to an integral cross arm 32 so that a distance between the portions 31, 30 is resiliently expansible. The clipping holder 40 may preferably be of one-piece construction forced of an elastic metal sheet material as best shown in FIG. 4.

The outside disk-like portion 31 is so formed as to serve as a cover disk and has a center hole 35 formed therein for insertion of a lock bolt 34 therethrough.

The inside disk-like portion 30 has a square hole 29 formed therein. The square hole 29 may preferably be surrounded by a reinforcing rim as illustrated in FIG. 4.

A stationary support spindle 22 (known per se) has a shank portion 22b and a base portion 22a which is square in cross section and serves as a mount weldable to a bicycle frame tube F. The shank portion 22b has a threaded axial hole 24 (FIG. 3) formed therein for engagement with a threaded shank 34a of the lock bolt 34. The free end portion 22c of the spindle shank portion 22b is partially cut off at opposite sides thereof to provide a pair of flat engaging surfaces as illustrated in FIG. 4.

Figure 5:
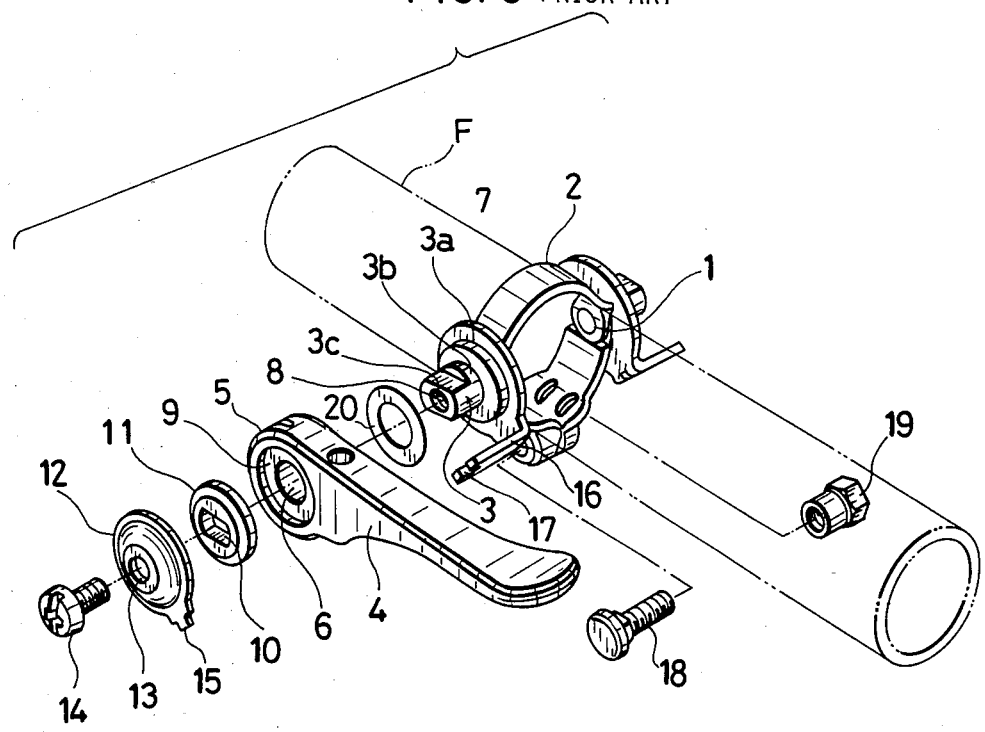
FIG. 5 is a similar view to FIG. 5, but showing one example of the conventional lever.

It is obvious that the support spindle 22 may be fixed at its one end to the bicycle frame tube (F) by the means of the clamp band 2 described in the foregoing with reference to FIG. 5, if desired.

The square base portion 22a of the lever support spindle 22 is so formed as to be fit into the square hole 29 of the inside disk-like portion 30 of the clipping holder 40, in order that the clipping holder 32 can be non-rotatably mounted on the spindle 22.

Configurations of the base portion 22a and the hole 29 should not be limited to the square shape only but may be varied in many ways so far as the employed configuration ensures that the inside disk-like portion 30 (and therefore the clipping holder 40) is not relatively rotatable with respect to the spindle 22.

Incidentally, a round hole formed in the cross arm 32 and appearing in FIGS. 3, 4 is merely for the purpose of decrease in weight. Every part for a bicycle is expected to be as light as possible.

Figure 2:
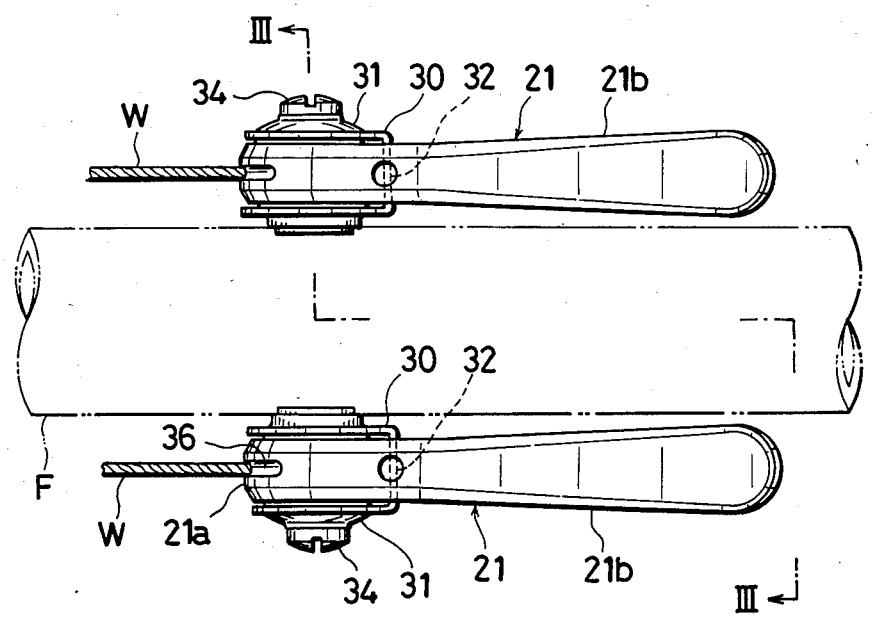
FIG. 2 is a top plan view of FIG. 1.

A lever handle 21 (known per se) has an enlarged end portion 21a in which a cylindrical through hole 25 is formed for insertion of the shank portion 22b of the support spindle 22, so that the lever handle 21 is rotatable on the spindle 22 when manipulated by a cyclist gripping its handle portion 21b (FIGS. 1 and 2).

An inward side face of the holed end portion 21a may preferably be formed with an inside seating recess 26a defined by an inward annular wall 26a' and an internal cylindrical wall 26a" as illustrated in FIGS. 3 and 4, so that an inside washer 27 can be seated therein.

As illustrated in FIG. 3, an outward side face of the holed end portion 21a may preferably be formed with an outside seating recess 26b defined by an outward annular wall 26b' and an internal cylindrical wall 26b" so that an outside washer 28 can be seated therein. The cylindrical through hole 25 is interposed between the inside and the outside seating recesses 26a, 26b in communication therewith.

The washers 27, 28 may be formed of synthetic resin or metal. Preferably, the thickness of the inside washer 27 is slightly greater than that of the inside seating recess 26a while the thickness of the outside washer 28 is slightly greater than that of the outside seating recess 26b, in order that frictional force developed when the lock bolt 34 is tightened can be effectively applied to the holed end portion 21a of the lever handle 21 for retaining the lever handle 21 in any selected position in use.

If desired, the outside washer 28 may be formed with a substantially oblong center hole 28a that corresponds to the shape of the cross section of the free end portion 22c of the support spindle 22, so that the washer 28 can be restricted from rotation to effectively apply the developed frictional force to the enlarged portion 21a of the lever handle 21 when the lock bolt 34 is tightened.

The threaded shank 34a of the lock bolt 34 extends through each hole of the holed members, that is, the outside disk-like portion 31 of the clipping holder 40, the outside washer 28, the holed end portion 21a of the lever handle 21, the inside washer 27 and the inside disk-like portion 30 of the clipping holder 40 into engagement with the threaded hole 24 of the support spindle 22 when they are assembled together as illustrated in FIG. 3.

Thus, by adjustably tightening the lock-bolt 34, the lever handle 21 can be held in any selected position on the stationary spindle by adjusted frictional force applied to the opposite sides of the holed end portion 21a thereof. However, when the lever handle 21 is manipulated by a cyclist for speed change, it is rotatable on the spindle 22 against the applied frictional force as well as tension force applied by a control cable W conventionally connected at its one end to the lever handle 21 as illustrated in FIGS. 1 and 2.

In the illustrated embodiment, the outside washer 28 and the clipping holder 40 are not co-rotatable when the lever handle 21 is rotated. Therefore, the frictional force can be effectively applied to the holed end portion 21a of the lever handle 21. In this connection, it will be obvious that the inside washer 27 may also be non-rotatably mounted on the support spindle 22, if desired, in order to increase the frictional force to by applied to the lever end portion 21a.

As illustrated in FIG. 1, the cross arm 32 of the clipping holder 40 may be utilized as a stopper for restricting over-rotation of the lever handle 21.

In storage of the described parts for the lever, the outside and inside washers 28, 27, the lever handle 21 and the clipping holder 40 are provisionally assembled together, with the outside washer 28 seated in the outside seating recess 26b, with the inside washer 27 seated in the inside seating recess 26a, and with the lever end portion 21a and the seated washers 28, 27 sandwiched between the outside and the inside disk-like portions 31, 30 of the clipping holder 40.

Because the resilient disk-like portions 31, 30 of the holder 40 can apply clipping pressure to the washers 28, 27 seated in the recesses 26b, 26a of the lever handle 21, the clipping holder 40, the lever 21 and the seated washers 28, 27 provides a provisionally assembled unit which can be stored and conveyed as it is to an assembly spot in the factory where the lever support spindles 22 have been welded to the bicycle frame tubes F beforehand.

At the assembly spot, the provisionally assembled unit can be readily mounted on the support spindle 22 by simply inserting the lock bolt 34 through the unit into engagement with the threaded hole 24 of the support spindle 22 welded to the bicycle frame tube F. Thus, efficient assembly of the lever can be attained.

Since the clipping holder 40, the lever handle 21 and the seated washers 28, 27 can be stored in the form of the provisionally assembled unit, the stock control and assortment of the parts can be managed easily.

In use, even if the lock bolt 34 is unexpectedly removed, the parts of the assembled unit do not scatter because of the clipping function of the holder 40.

The bicycle speed change lever according to the invention may be utilized to manipulate the first control cable connected to the rear derailleur or the second control cable connected to the front derailleur. In the case where the bicycle is equipped with both of the rear and the front derailleurs, a pair of speed change levers are required as illustrated in FIG. 2. In the case where the bicycle is equipped with the rear derailleur only, one speed change lever therefor is sufficient.

The present invention being thus described, it will be obvious that same may be varied in many ways. Such variations are not to be regarded as a departure from the spirit and scope of the invention, and all such modifications as would be obvious to one skilled in the art are intended to be included within the following claims.

I claim:

1. A bicycle speed change lever comprising:
   a stationary support spindle adapted to be fixed to a bicycle frame tube and having an internally threaded axial hole formed therein,
   a lever handle rotatably mounted at its holed end portion on said spindle,
   a plurality of washers supported on said spindle,
   a clipping holder which has a pair of axially spaced, holed disk-like portions, that is, an outside disk-like portion and an inside disk-like portion, resiliently connected to an integral cross arm and which is non-rotatably mounted on said spindle,
   said inside disk-like portion being provided with means for preventing relative rotation of said clipping holder with respect to said spindle,
   said washers and said holed end portion of the lever handle being sandwiched between said pair of disk-like portions and held together by pressure, and
   a lock bolt having a threaded shank engaged with said threaded axial hold of said spindle.

2. The bicycle speed change lever as defined in claim 1, wherein
   said means is in the form of a square hole formed in said inside disk-like portion, and
   said spindle has a square base portion which cooperates with said square hole to prevent said relative rotation of said clipping holder.

3. The bicycle speed change lever as defined in claim 1, wherein
   said holed end portion of the lever handle has an inward side face in which an inside seating recess is formed for seating a first one of said washers.

4. The bicycle speed change lever as defined in claim 1, wherein
   said holed end portion of the lever handle has an outward side face in which an outside seating recess is formed for seating a second one of said washers.

5. The bicycle speed change lever as defined in claim 1, wherein
   said cross arm of said clipping holder serves as a stopper for preventing over-rotation of said lever handle.

* * * * *